UNITED STATES PATENT OFFICE.

OTTO G. H. E. KEHRHAHN, OF NEW ROCHELLE, NEW YORK.

ELECTRIC SIGNALING APPARATUS.

1,145,901.      Specification of Letters Patent.      Patented July 13, 1915.

Application filed December 4, 1913. Serial No. 804,572.

*To all whom it may concern:*

Be it known that I, OTTO G. H. E. KEHRHAHN, a citizen of the United States, residing in the city of New Rochelle, in the county of Westchester, in the State of New York, have invented certain new and useful Improvements in Electric Signaling Apparatus, of which the following is a specification, reference being had to the accompanying drawings, forming a part hereof.

This invention relates to an apparatus especially designed with reference to its use for signaling purposes in the open air under such conditions of use as will be encountered by ships at sea and by trains.

It has for its principal object to provide an apparatus which shall be operative under the most adverse weather conditions and shall be especially effective in fogs, rain and snow storms. The inadequacy of known signaling devices designed for use under service conditions on railroads and at sea is evidenced by the increasing number of catastrophies, the proximate cause of which may be found in the signals employed, such signals being practically ineffective under the adverse weather conditions referred to above. In accordance with the present invention there is provided an apparatus by means of which may be produced electrical flashes of great intensity and of such penetrating power as to be readily visible within a comparatively wide radius under all circumstances and in spite of heavy blankets of fog, rain or snow.

A further object of the invention is to provide an apparatus of the character referred to which shall be comparatively simple in its construction and invariable in its operation, so that the electrodes, by means of which the flashes are produced, shall be unaffected by the elements.

Still another object is to construct an apparatus in which there are employed fixed electrodes and a movable electrode which, by reason of the disposition of the fixed electrodes may produce, at a given rate of speed of the movable electrode, a series of intermittent and periodic flashes. By means of this construction it becomes possible for each train or boat which is provided with the improved signaling device to carry one which shall have a distinctive and characteristic series of flashes.

A further object is to provide in combination with a fixed electrode, a movable electrode, the speed of which may be varied at the will of the operator so that the intermittent flashes referred to above may be formed so rapidly as to constitute in effect, and especially when viewed from a distance, a continuous or lightning-like flash.

These and other objects will appear hereinafter as this description proceeds, reference now being had to the accompanying drawings for a detailed description of the invention, in which—

Figure 1:
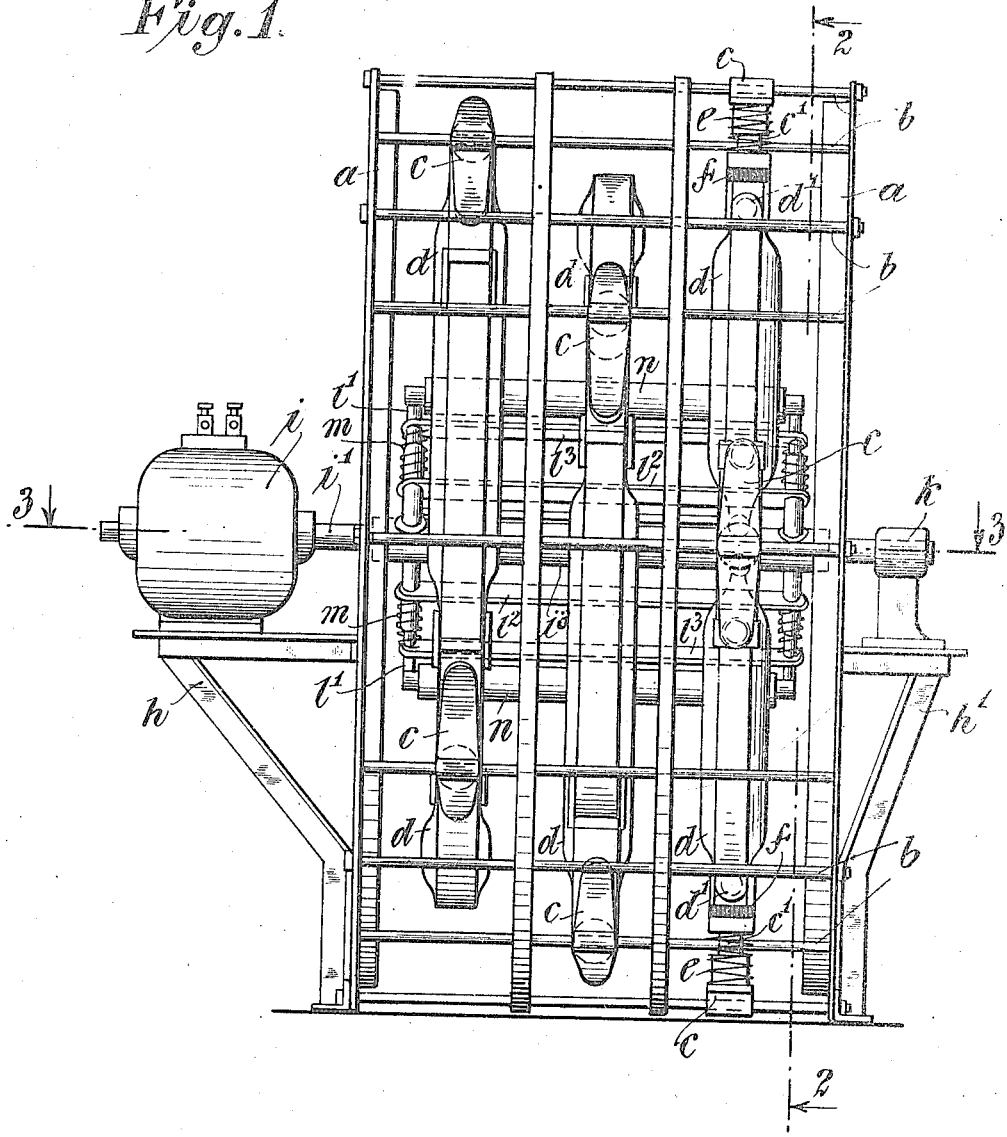
Figure 2:
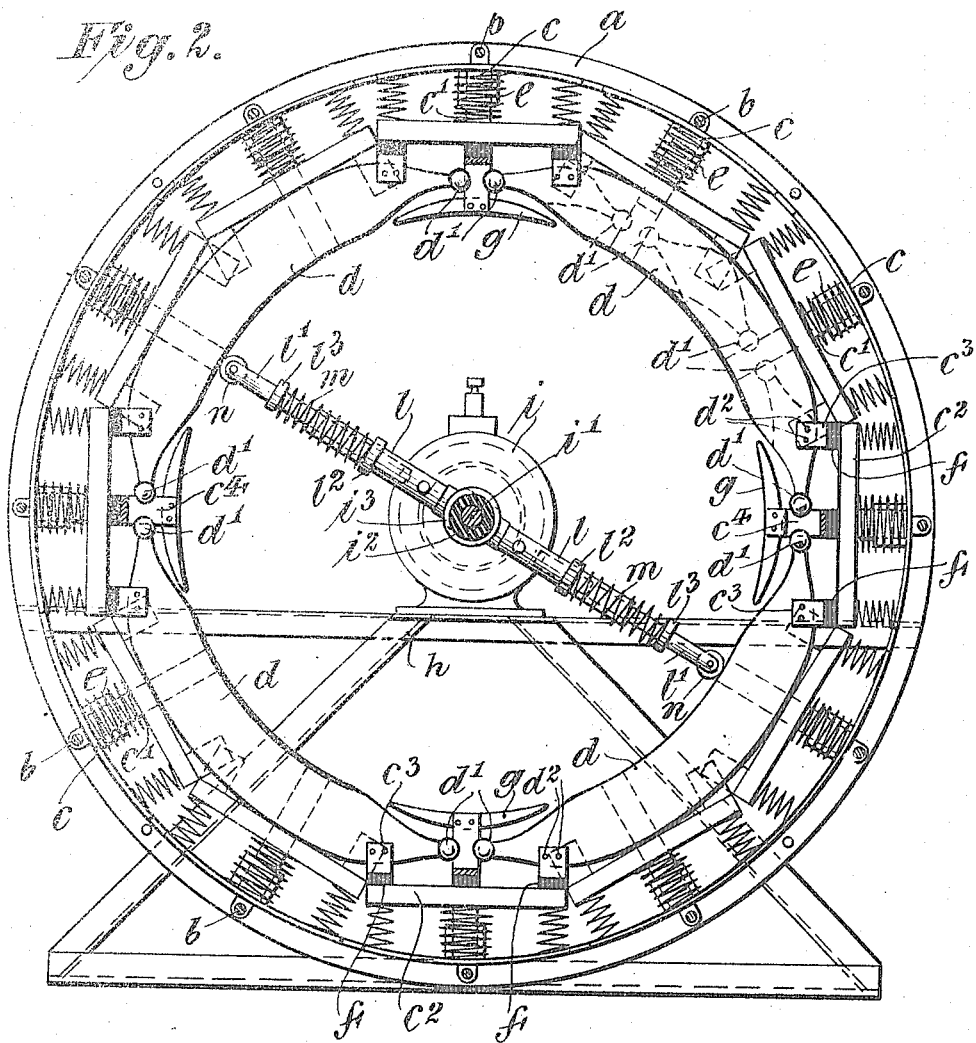
Figure 3:
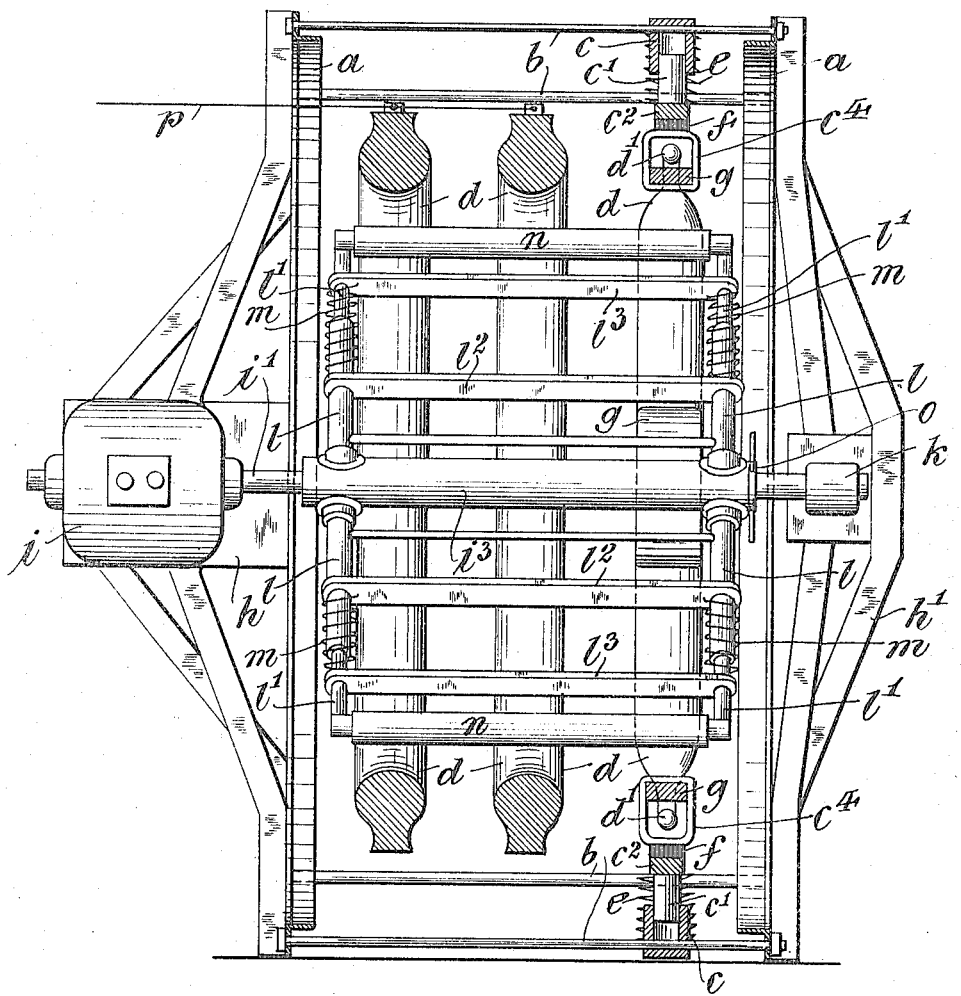
Figure 4:
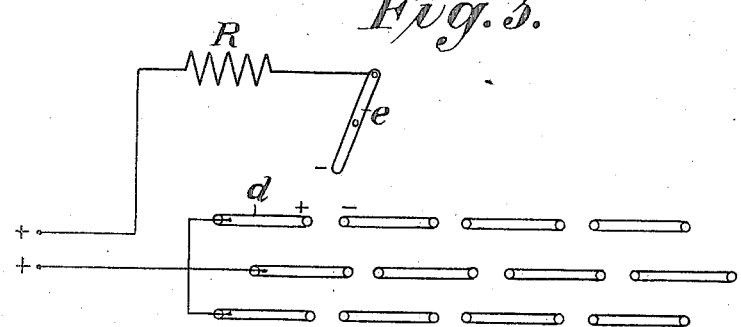

Figure 1 is a view in front elevation of an apparatus constructed in accordance with the present invention. Fig. 2 is a view in side elevation thereof, parts being broken away along the line 2—2 of Fig. 1 in the interest of clearness. Fig. 3 is a view in section taken on the plane indicated by the line 3—3 of Fig. 1 and looking in the direction of the arrows. Fig. 4 is a diagrammatic view of the electrical connections, the rotating arm and the fixed electrodes being indicated conventionally, but being intended to coöperate with each other in the manner described particularly in the specification in connection with the remaining figures.

The apparatus illustrated in the accompanying drawings and described herein is merely an example of one practical embodiment of the invention, although as this description proceeds, it will be evident that the particular form and shape of the constituent parts thereof and of the whole may be varied through wide ranges without departing from the spirit of the invention.

The apparatus in the illustrated embodiment is provided with a circular supporting frame $a$ having transverse tie rods $b$ from which may be supported through arms $c$ a series of arcuate electrodes $d$ which are substantially concentric with the axis of the frame $a$. The arms $c$ may be provided with a telescoping portion $c'$ and have interposed between the electrodes $d$ and the tie rods $b$ a spiral spring $e$ by which the electrodes are yieldingly supported for reasons which will later appear. The electrodes $d$ are arranged in a continuous series in the same vertical plane to form substantially an annular fixed electrode with gaps between the ends $d'$ of adjacent segments. The end of each segmental electrode $d$ is preferably tapered somewhat and is provided with a spherical knob of steel bronze or other suitable material to form, in effect, a condenser or storage portion from which may be discharged, at high tension, vivid electric flashes in a manner which will be pointed out hereinafter. Each one of the supporting posts $c'$ may be fixed rigidly to the contiguous ends of the nearest pair of electrodes $d$ by means of a suitable bracket $c^2$ carrying lugs $c^3$ which may be fastened to the electrodes by means of bolts $d^2$. It is to be noted that the electrodes $d$ are insulated from the supporting posts $c'$ and the transverse stay rods $b$ by means of suitable insulating material $f$ interposed between the bracket $c^2$ and the lugs $c^3$. Upon the central portion of the bracket $c^2$ is secured a supporting arm $c^4$ which is of such form as to pass around the knobs $d'$ on the ends of the adjoining electrodes $d$. On the inner end of the arm $c^4$ is secured a metallic bridging piece $g$ which serves to span the distance between the concentric portions of the inner faces of the adjoining electrodes $d$, a small gap being left however between the end of the bridging piece and the adjacent electrodes. The purpose of the bridging piece with its arcuate face is to form with the concentric portions of the adjoining pair of electrodes $d$ a substantially continuous and circular path for the movable electrode which is yet to be described.

It will be observed from Figs. 1 and 3 that there are arranged within the annular frame $a$ three series of such segmental electrodes $d$ as have been described above and it will be evident that the number of series may be increased or decreased to suit different conditions of use without departing from the scope of the invention. It will be further observed, as indicated in dotted lines in Fig. 2, that these several series of segmental electrodes $d$ have their terminal ends or knobs $d'$ staggered transversely of the frame so that the electrical discharges occasioned at these terminal ends will occur at different intervals along each series, the effect being either a succession of independent flashes, or, under circumstances which may be controlled in a manner to be later described, a continuous streak of light. While in practice the staggering arrangement referred to will be desirable, it is not essential to the employment of the improved apparatus, but the knobs may be arranged in alinement.

The frame $a$ has secured thereto in any suitable manner and on each side thereof platforms $h$ and $h'$ on the first of which may be supported a suitable driving motor $i$ and on the second of which may be supported a bearing $k$ for the motor shaft $i'$, the latter extending throughout the width of the annular frame $a$ and being substantially co-axial therewith. The motor shaft $i'$ carries thereon an annular insulating sleeve $i^2$ on which is placed a metallic sleeve $i^3$, the last named sleeve being thus insulated from the motor $i$. The sleeve $i^3$ carries thereon one or more radial arms $l$ which may be, like the electrodes $d$, provided with telescoping posts $l'$. In the preferred embodiment, the arms $l$ are secured to the sleeve $i^3$ in pairs and are united by rigid bars $l^2$. Likewise the corresponding pairs of posts $l'$ are rigidly connected by means of transverse rods $l^3$. Between the bars $l^2$ and $l^3$ and encircling the posts $l'$ and arms $l$ are interposed spiral springs $m$. At the extremities of the posts $l'$ are mounted rotatably rollers $n$ of suitable conducting material and these rollers by means of the structure just described are pressed against the inner arcuate faces of all of the series of fixed electrodes $d$ and held thereon during rotation of the arms $l$ under the operation of the motor $i$. The purely mechanical features of the illustrated embodiment of the invention having been described, it remains to point out how operative electrical connections may be made therewith to produce vivid electrical flashes upon movement of the rollers $n$ from the inner faces of the electrodes $d$ to the bridging pieces $g$ or vice versa. The current may be derived from any available high tension system, it being desirable to provide a high voltage and low amperage for the production of the flashes. To minimize the amperage the segmental electrodes $d$ are preferably of high resistance. These electrodes may also be impregnated with suitable metallic salts to accentuate the luminosity of the flashes produced at the points where the rollers $n$ in their travel leave the inner faces of the segments and pass on to the bridging pieces $g$. The radial arms $l$ and posts $l'$, of course, constitute the negative electrodes of the system and so they are preferably mounted in any convenient manner, the drawings showing one means by which the current may be taken off the sleeve $i^3$ through the collecting rings $o$. The positive electrodes $d$ of one circular group are preferably all connected in parallel to a feed wire $p$ which, as indicated above, is connected to any available source of power. A suitable resistance such as indicated in Fig. 4 may be interposed in the circuit, thus insuring the requisite voltage and preventing an excessive flow of current.

In operation the rotation of the motor shaft $i'$ moves the rollers $n$ along the inner faces of the electrodes $d$, at which time the electrical circuit is complete, and passes them periodically on to the bridging pieces $g$ at which time the electric circuit is first broken and then made again as the rollers leave the bridging pieces $g$ and pass to the next electrodes $d$. Referring particularly to Fig. 4, it will be evident that the circuit from each fixed electrode must be completed through the moving arm and the resistance coil where one is provided. When the movable electrode $n$ passes over the first electrode $d$ in one of these groups, and subsequently on to the second of the electrodes, a vivid flash between proximate knobs is produced. As the moving electrode passes across the face of the second electrode the circuit is completed through said electrode and through the moving arm. This description of the operation of the electrodes, of course, obtains for the electrodes in all of the other groups. It will be understood that at the instant the circuit is thus broken vivid electrical flashes will be caused between the electrodes $d$ and the movable electrodes $n$. Likewise the knobs $d'$ which at the instant of make with rollers $n$ become highly charged with the high potential of the source of power, will cause a static discharge or flash of intense brilliancy across to the adjacent knob. Prior to this, however, immediately preceding it or substantially simultaneously therewith, a discharge may take place between the roller $n$ and the electrode $d$ that it approaches, so that substantially simultaneous discharges of flashes occur between the roller $n$, the electrodes $d$ and the bridging piece $g$, and also between the knobs $d'$. The number of series of staggered electrodes $d$ and the speed of rotation of the motor shaft $i'$ will determine the frequency of the flashes thus produced and so it becomes possible for the operator to produce either a distinct series of flashes at infrequent intervals or a continuous streak of light or a series of flashes of any desired frequency. Such a construction will be especially useful in the case of light-houses where each light must be distinctive either in color or, as will be more satisfactory, in the character of the light itself as regards the frequency of its flashes.

As has been pointed out before herein the shape and size of the supporting frame $a$ may be varied within wide ranges. All modifications and rearrangements are to be deemed within the scope of this invention which fall within the appended claims provided the results sought to be realized by its practice are indeed produced.

I claim as my invention:

1. An electric signaling apparatus comprising a source of electricity a circular frame, a series of arcuate electrodes mounted thereon and concentric therewith, bridging pieces mounted on the frame between the ends of adjacent electrodes but spaced therefrom by an air gap and having their inner faces concentric with the inner faces of the electrodes, a power shaft mounted co-axially with the supporting frame, a movable electrode carried radially on said power shaft and having its free end in engagement with the inner faces of the fixed electrodes whereby upon rotation of the power shaft the movable electrode is carried successively into and out of engagement with said fixed electrodes.

2. An electric signaling apparatus comprising a source of electricity a supporting frame, a series of fixed electrodes mounted thereon in spaced relationship, condenser knobs formed on the proximate ends of adjacent electrodes, and a movable electrode supported in operative relation to said fixed electrodes and movable across the faces thereof to make and break successively the electrical circuit whereby vivid flashes are emitted from said knobs.

3. An electric signaling apparatus comprising a source of electricity a circular supporting frame, rows of series of arcuate fixed electrodes mounted thereon, the electrodes in each series being in spaced relationship and concentric with each other and with the supporting frame, and movable electrodes supported in operative relation to each of said series of fixed electrodes whereby the electrical circuit through each of said fixed electrodes is successively made and broken and flashes produced, the spaces between adjacent electrodes in the rows being staggered with respect to each other.

4. An electric signaling apparatus comprising a source of electricity a circular supporting frame, rows of series of arcuate electrodes mounted yieldingly on said frame, the electrodes of each series being spaced from each other and concentric with each other and with the supporting frame, knobs carried on the proximate ends of adjacent electrodes, bridging pieces mounted yieldingly on the supporting frame between adjacent electrodes and having their inner faces concentric with the inner faces of the fixed electrodes to form a nearly continuous annular path, the bridging pieces in the rows being staggered with respect to each other, an electric motor mounted on the supporting frame and having its shaft extending axially therethrough, and radial arms carried on the motor shaft and insulated therefrom, said arms having their free ends in operative relation to the inner faces of the fixed electrodes and constituting the negative electrodes of the electrical system, rotation of the motor shaft serving to move the movable electrode successively into and out of engagement with the fixed electrodes whereby a series of intermittent flashes is produced at the points where the circuit is thus made and broken and at the knobs.

This specification signed and witnessed this first day of December A. D. 1913.

OTTO G. H. E. KEHRHAHN.

Signed in the presence of—
FRANCIS J. MURPHY,
WORTHINGTON C. CAMPBELL.